(12) United States Patent
Burgess et al.

(10) Patent No.: US 11,080,054 B2
(45) Date of Patent: Aug. 3, 2021

(54) DATA PROCESSING APPARATUS AND METHOD FOR GENERATING A STATUS FLAG USING PREDICATE INDICATORS

(71) Applicant: ARM LIMITED, Cambridge (GB)

(72) Inventors: Neil Burgess, Cardiff (GB); Lee Evan Eisen, Round Rock, TX (US); Gary Alan Gorman, Austin, TX (US); Daniel Arulraj, Austin, TX (US)

(73) Assignee: ARM LIMITED, Cambridge (GB)

( * ) Notice: Subject to any disclaimer, the term of this patent is extended or adjusted under 35 U.S.C. 154(b) by 397 days.

(21) Appl. No.: 15/236,728

(22) Filed: Aug. 15, 2016

(65) Prior Publication Data

US 2018/0046459 A1   Feb. 15, 2018

(51) Int. Cl.
*G06F 9/30* (2018.01)

(52) U.S. Cl.
CPC ........ *G06F 9/30094* (2013.01); *G06F 9/3001* (2013.01); *G06F 9/30018* (2013.01);
(Continued)

(58) Field of Classification Search
CPC ............. G06F 9/30036; G06F 9/30072; G06F 9/30094; G06F 9/30018
See application file for complete search history.

(56) References Cited

U.S. PATENT DOCUMENTS

| | | | |
|---|---|---|---|
| 7,991,820 B1 * | 8/2011 | Sohay ..................... | G06F 7/505 708/671 |
| 2006/0004996 A1 * | 1/2006 | Gonion ................... | G06F 8/441 712/241 |

(Continued)

OTHER PUBLICATIONS

Office Action dated Jan. 28, 2019 in co-pending U.S. Appl. No. 15/236,769, 17 pages.

(Continued)

*Primary Examiner* — William B Partridge
*Assistant Examiner* — Courtney P Carmichael-Moody
(74) *Attorney, Agent, or Firm* — Nixon & Vanderhye, P.C.

(57) ABSTRACT

Data processing apparatus comprises processing circuitry to selectively apply vector processing operations to one or more data items of one or more data vectors each comprising an ordered plurality of data items at respective vector positions in the data vector, according to the state of respective predicate indicators associated with the vector positions; predicate generation circuitry to apply a processing operation to generate an ordered set of predicate indicators, each associated with a respective one of the vector positions, the ordered set of predicate indicators being associated with an ordered set of active indicators each having an active or an inactive state; and a detector to detect a status flag indicative of whether a predicate indicator at a position, in the ordered set of predicate indicators, corresponding to the position of an outermost active indicator having the active state, has a given state; in which the detector comprises: first and second circuitry to combine the ordered set of predicate indicators and the ordered set of active indicators using first and second respective logical bit-wise combinations to generate first and second ordered sets of intermediate data; and arithmetic circuitry to combine the first and second ordered sets of intermediate data using an arithmetic combination generating a carry bit, the detector generating the status flag in dependence upon the carry bit.

21 Claims, 6 Drawing Sheets

(52) U.S. Cl.
CPC ...... *G06F 9/30036* (2013.01); *G06F 9/30072* (2013.01); *G06F 9/3013* (2013.01)

(56) References Cited

U.S. PATENT DOCUMENTS

| | | | |
|---|---|---|---|
| 2008/0052456 A1 | 2/2008 | Ash | |
| 2010/0325399 A1* | 12/2010 | Gonion | G06F 8/4441 712/222 |
| 2010/0329267 A1 | 12/2010 | Sakamoto | |
| 2011/0035567 A1* | 2/2011 | Gonion | G06F 9/3838 712/5 |
| 2011/0078415 A1* | 3/2011 | Johnson | G06F 9/30021 712/208 |
| 2014/0289495 A1 | 9/2014 | Gonion | |
| 2014/0289496 A1* | 9/2014 | Gonion | G06F 9/30036 712/9 |
| 2015/0339158 A1 | 11/2015 | Harris et al. | |
| 2016/0092218 A1 | 3/2016 | Gonion | |
| 2016/0342417 A1* | 11/2016 | Uliel | G06F 9/30036 |

OTHER PUBLICATIONS

U.S. Appl. No. 15/236,769, filed Aug. 15, 2016, Inventor: Gorman et al.
Office Action dated Dec. 12, 2019 issued in co-pending U.S. Appl. No. 15/236,769, 14 pages.
Office Action dated Apr. 3, 2020 issued in co-pending U.S. Appl. No. 15/236,769, 17 pages.

* cited by examiner

DATA PROCESSING APPARATUS AND METHOD FOR GENERATING A STATUS FLAG USING PREDICATE INDICATORS

BACKGROUND

The present disclosure relates to data processing apparatus and methods.

Some data processing arrangements allow for vector processing operations, involving applying a single vector processing instruction to data items of a data vector having a plurality of data items at respective positions in the data vector. By contrast, scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

In some systems, vector processing operations are (at least in part) under the control of so-called predicate indicators, so that processing circuitry is used to selectively apply vector processing operations to one or more data items of one or more data vectors each comprising a plurality of data items at respective vector positions in the data vector, according to the state of respective predicate indicators associated with the vector positions.

SUMMARY

In one example configuration, there is provided a data processing apparatus comprising: processing circuitry to selectively apply vector processing operations to one or more data items of one or more data vectors each comprising an ordered plurality of data items at respective vector positions in the data vector, according to the state of respective predicate indicators associated with the vector positions;

predicate generation circuitry to apply a processing operation to generate an ordered set of predicate indicators, each associated with a respective one of the vector positions, the ordered set of predicate indicators being associated with an ordered set of active indicators each having an active or an inactive state; and a detector to detect a status flag indicative of whether a predicate indicator at a position, in the ordered set of predicate indicators, corresponding to the position of an outermost active indicator having the active state, has a given state;

in which the detector comprises:

first and second circuitry to combine the ordered set of predicate indicators and the ordered set of active indicators using first and second respective logical bit-wise combinations to generate first and second ordered sets of intermediate data; and arithmetic circuitry to combine the first and second ordered sets of intermediate data using an arithmetic combination generating a carry bit, the detector generating the status flag in dependence upon the carry bit.

In another example configuration, there is provided a data processing apparatus comprising:

processing circuitry to selectively apply vector processing operations to one or more data items of one or more data vectors each comprising an ordered plurality of data items at respective vector positions in the data vector, according to the state of respective predicate indicators associated with the vector positions;

predicate generation circuitry to apply a processing operation to generate an ordered set of predicate indicators, each associated with a respective one of the vector positions, the ordered set of predicate indicators being associated with an ordered set of active indicators each having an active or an inactive state; and a detector to detect a status flag indicative of whether a predicate indicator at a position, in the ordered set of predicate indicators, corresponding to the position of an outermost active indicator having the active state, has a given state;

in which the detector comprises:

count circuitry to generate a count value, being a number of outermost active indicators in the ordered set of active indicators which are in the inactive state;

shift circuitry to shift the ordered set of predicate indicators by a number of positions dependent upon the count value, to generate a shifted set of predicate indicators; and output circuitry to generate the status flag in dependence upon whether an outermost one of the shifted set of predicate indicators has the given state.

In another example configuration, there is provided a data processing method comprising:

selectively applying vector processing operations to one or more data items of one or more data vectors each comprising an ordered plurality of data items at respective vector positions in the data vector, according to the state of respective predicate indicators associated with the vector positions;

generating an ordered set of predicate indicators, each associated with a respective one of the vector positions, the ordered set of predicate indicators being associated with an ordered set of active indicators each having an active or an inactive state; and detecting a status flag indicative of whether a predicate indicator at a position, in the ordered set of predicate indicators, corresponding to the position of an outermost active indicator having the active state, has a given state;

in which the detecting step comprises:

combining the ordered set of predicate indicators and the ordered set of active indicators using first and second respective logical bit-wise combinations to generate first and second ordered sets of intermediate data;

combining the first and second ordered sets of intermediate data using an arithmetic combination generating a carry bit; and generating the status flag in dependence upon the carry bit.

In another example configuration, there is provided a data processing method comprising:

selectively applying vector processing operations to one or more data items of one or more data vectors each comprising an ordered plurality of data items at respective vector positions in the data vector, according to the state of respective predicate indicators associated with the vector positions;

generating an ordered set of predicate indicators, each associated with a respective one of the vector positions, the ordered set of predicate indicators being associated with an ordered set of active indicators each having an active or an inactive state; and detecting a status flag indicative of whether a predicate indicator at a position, in the ordered set of predicate indicators, corresponding to the position of an outermost active indicator having the active state, has a given state;

in which the detecting step comprises:

generating a count value, being a number of outermost active indicators in the ordered set of active indicators which are in the inactive state;

shifting the ordered set of predicate indicators by a number of positions dependent upon the count value, to generate a shifted set of predicate indicators; and generating the status flag in dependence upon whether an outermost one of the shifted set of predicate indicators has the given state.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
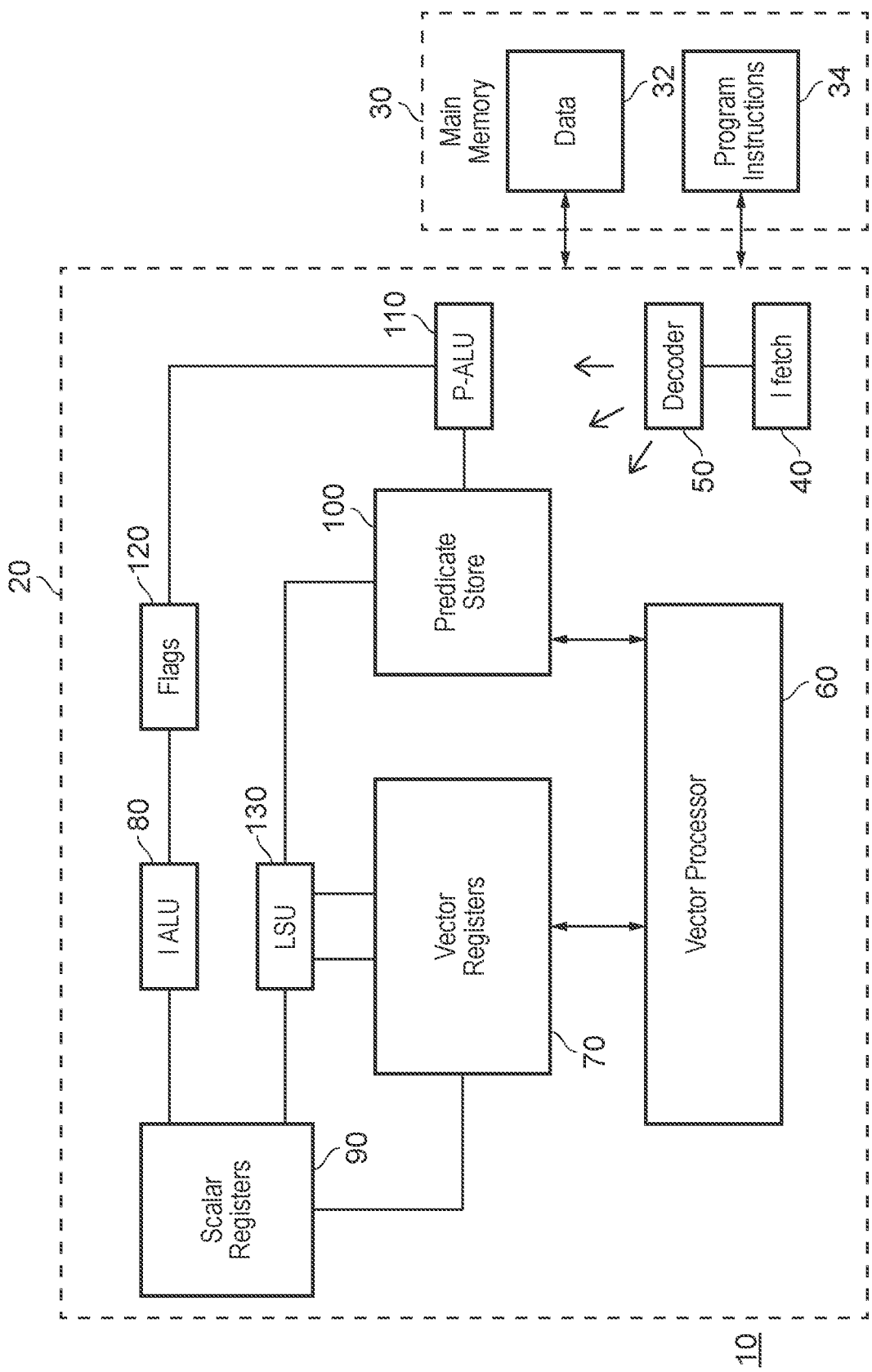
FIG. 1 schematically illustrates a data processing apparatus.

Before discussing the embodiments with reference to the accompanying figures, the following description of embodiments is provided.

In one embodiment, there is provided an Data processing apparatus comprising:

processing circuitry to selectively apply vector processing operations to one or more data items of one or more data vectors each comprising an ordered plurality of data items at respective vector positions in the data vector, according to the state of respective predicate indicators associated with the vector positions;

predicate generation circuitry to apply a processing operation to generate an ordered set of predicate indicators, each associated with a respective one of the vector positions, the ordered set of predicate indicators being associated with an ordered set of active indicators each having an active or an inactive state; and a detector to detect a status flag indicative of whether a predicate indicator at a position, in the ordered set of predicate indicators, corresponding to the position of an outermost active indicator having the active state, has a given state;

in which the detector comprises:

first and second circuitry to combine the ordered set of predicate indicators and the ordered set of active indicators using first and second respective logical bit-wise combinations to generate first and second ordered sets of intermediate data; and arithmetic circuitry to combine the first and second ordered sets of intermediate data using an arithmetic combination generating a carry bit, the detector generating the status flag in dependence upon the carry bit.

The example configurations provide an elegantly convenient technique whereby status flags associated with the state of a set of predicate indicators can be generated.

Status flags can be used, for example to indicate whether a predicate indicator having a position, in the ordered set of vector positions, of the most significant active indicator in the active state or the least significant active indicator in the active state, is set to a give state. Here the term "outermost" in the context of an ordered set of positions is used as a generic expression for either of "most significant" and "least significant". So, the discussion can relate to one or two status flags, being either or both of:

a status flag indicating whether a predicate indicator at a position, in the ordered set of predicate indicators, corresponding to the position of a most significant active indicator having the active state, has the given state; and a status flag indicating whether a predicate indicator at a position, in the ordered set of predicate indicators, corresponding to the position of a most significant active indicator having the active state, has the given state.

The example configurations use two stages of derivation of such status flag(s): a bitwise logical operation and an arithmetic combination. This allows existing or available logic on a processing device such as an integrated circuit device to be used in a straightforward way, which can be simpler or cheaper (in terms of usage of the available space or processing on an integrated circuit device) than other techniques. Indeed, the logic can in some examples re-use circuitry such as arithmetic combination circuitry which might be provided for other purposes.

In some examples, the arithmetic operation is logically equivalent to an arithmetic addition operation. In examples, the first logical bit-wise combination is logically equivalent to a logical AND combination; and the second logical bit-wise combination is logically equivalent to a logical OR combination of the ordered set of predicate indicators with the bit-wise inverse of the ordered set of active indicators.

One example of a status flag is found in an arrangement in which the ordered set of predicate indicators and the ordered set of active indicators are ordered between a least significant position and a most significant position; and the status flag is indicative of whether a predicate indicator at a position, in the ordered set of predicate indicators, corresponding to the position of a most significant active indicator having the active state, has the given state.

The status flag in this example may be active when low, in which case the detector may be configured to invert the carry bit.

In another example, the status flag may relate to the state of the predicate indicator having a position at which the least significant active indicator is in the active state. In other words, the ordered set of predicate indicators and the ordered set of active indicators are ordered between a least significant position and a most significant position; and the status flag is indicative of whether a predicate indicator at a position, in the ordered set of predicate indicators, corresponding to the position of a least significant active indicator having the active state, has the given state. In such examples, the detector may be configured to bit-reverse either (i) the ordered set of predicate indicators and the ordered set of active indicators to generate respective bit-reversed versions, the first and second circuitry acting on the bit-reversed versions of the ordered set of predicate indicators and the ordered set of active indicators; or (ii) the first and second ordered sets of intermediate data to generate respective bit-reversed versions, the arithmetic circuitry acting on the bit-reversed versions of the first and second ordered sets of intermediate data.

In other examples, the arithmetic operation is logically equivalent to an arithmetic subtraction operation. In examples, the first logical bit-wise combination is logically equivalent to a logical AND combination; and the second logical bit-wise combination is logically equivalent to a logical AND combination of the ordered set of active indicators with the bit-wise inverse of the ordered set of predicate indicators.

As discussed above, in examples the ordered set of predicate indicators and the ordered set of active indicators may be ordered between a least significant position and a most significant position; and the status flag is indicative of whether a predicate indicator at a position, in the ordered set of predicate indicators, corresponding to the position of a most significant active indicator having the active state, has the given state. If the status flag is active when low, the detector may be configured to invert the carry bit.

In other examples, the ordered set of predicate indicators and the ordered set of active indicators are ordered between a least significant position and a most significant position; and the status flag is indicative of whether a predicate indicator at a position, in the ordered set of predicate indicators, corresponding to the position of a least significant active indicator having the active state, has the given state. In such examples, the detector is configured to bit-reverse either (i) the ordered set of predicate indicators and the ordered set of active indicators to generate respective bit-reversed versions, the first and second circuitry acting on the bit-reversed versions of the ordered set of predicate indicators and the ordered set of active indicators; or (ii) the first and second ordered sets of intermediate data to generate respective bit-reversed versions, the arithmetic circuitry acting on the bit-reversed versions of the first and second ordered sets of intermediate data.

In examples arrangements the processing circuitry is configured to apply a vector processing operation to generate an output data vector; and the predicate indicators are associated with respective vector positions in the output data vector so that vector processing operations are applied to generate data items in the output data vector at vector positions indicated by predicate indicators in the given state. However, other significances of the given state (a logical one state, for example, in an exemplary system in which each predicate indicator is a one-bit indicator) can be used, for example a significance that relates to whether a vector position of an input data vector corresponding to the predicate indicator position is used in a calculation. The processing circuitry may comprise instruction decoder circuitry to decode program instructions; and instruction processing circuitry to execute instructions decoded by the instruction decoder circuitry.

Various logical states and bit sizes of the predicate indicators and active indicators are possible, but in examples the active state and the given state are each represented by a logical 1.

Another example embodiment provides a data processing apparatus comprising:

processing circuitry to selectively apply vector processing operations to one or more data items of one or more data vectors each comprising an ordered plurality of data items at respective vector positions in the data vector, according to the state of respective predicate indicators associated with the vector positions;

predicate generation circuitry to apply a processing operation to generate an ordered set of predicate indicators, each associated with a respective one of the vector positions, the ordered set of predicate indicators being associated with an ordered set of active indicators each having an active or an inactive state; and a detector to detect a status flag indicative of whether a predicate indicator at a position, in the ordered set of predicate indicators, corresponding to the position of an outermost active indicator having the active state, has a given state;

in which the detector comprises:

count circuitry to generate a count value, being a number of outermost active indicators in the ordered set of active indicators which are in the inactive state;

shift circuitry to shift the ordered set of predicate indicators by a number of positions dependent upon the count value, to generate a shifted set of predicate indicators; and output circuitry to generate the status flag in dependence upon whether an outermost one of the shifted set of predicate indicators has the given state.

In these example configurations, an elegantly convenient bit shifting arrangement is used so that the ordered set of predicate indicators are shifted by a number of bits dependent upon the count value (for example, equal to the count value in the case that each predicate indicator is a one-bit indicator) so that the most significant or least significant predicate indicator position (generically: an outermost position) is occupied by the original predicate indicator at the outermost position for which the active indicator had an active state. This conveniently allows the status flag to be generated directly from that shifted outermost predicate indicator.

In an example configuration in which the predicate indicators are one-bit indicators, the shift circuitry can be bit-shift circuitry; and the number of positions can be a number of bit positions.

In examples where the status flag is indicative of whether a predicate indicator at a position, in the ordered set of predicate indicators, corresponding to the position of a most significant active indicator having the active state, has the given state, the ordered set of predicate indicators and the ordered set of active indicators may be ordered between a least significant position and a most significant position; the count circuitry may be configured to generate the count value as a number of most significant active indicators in the ordered set of active indicators which are in the inactive state; the shift circuitry may be configured to shift the ordered set of predicate indicators in a more significant direction; and the output circuitry may be configured to generate the status flag in dependence upon whether a most significant bit of the shifted set of predicate indicators has the given state.

In examples where the status flag is indicative of whether a predicate indicator at a position, in the ordered set of predicate indicators, corresponding to the position of a least significant active indicator having the active state, has the given state, the ordered set of predicate indicators and the ordered set of active indicators may be ordered between a least significant position and a most significant position; the status flag may be indicative of whether a predicate indicator at a position, in the ordered set of predicate indicators, corresponding to the position of a least significant active indicator having the active state, has the given state; the count circuitry may be configured to generate the count value as a number of least significant active indicators in the ordered set of active indicators which are in the inactive state; the shift circuitry may be configured to shift the ordered set of predicate indicators in a less significant direction; and the output circuitry may be configured to generate the status flag in dependence upon whether a least significant bit of the shifted set of predicate indicators has the given state.

Another example embodiment provides a data processing method comprising:

selectively applying vector processing operations to one or more data items of one or more data vectors each comprising an ordered plurality of data items at respective vector positions in the data vector, according to the state of respective predicate indicators associated with the vector positions;

generating an ordered set of predicate indicators, each associated with a respective one of the vector positions, the ordered set of predicate indicators being associated with an ordered set of active indicators each having an active or an inactive state; and detecting a status flag indicative of whether a predicate indicator at a position, in the ordered set of predicate indicators, corresponding to the position of an outermost active indicator having the active state, has a given state;

in which the detecting step comprises:

combining the ordered set of predicate indicators and the ordered set of active indicators using first and second respective logical bit-wise combinations to generate first and second ordered sets of intermediate data;

combining the first and second ordered sets of intermediate data using an arithmetic combination generating a carry bit; and generating the status flag in dependence upon the carry bit.

Another example embodiment provides a data processing method comprising:

selectively applying vector processing operations to one or more data items of one or more data vectors each comprising an ordered plurality of data items at respective vector positions in the data vector, according to the state of respective predicate indicators associated with the vector positions;

generating an ordered set of predicate indicators, each associated with a respective one of the vector positions, the ordered set of predicate indicators being associated with an ordered set of active indicators each having an active or an inactive state; and detecting a status flag indicative of whether a predicate indicator at a position, in the ordered set of predicate indicators, corresponding to the position of an outermost active indicator having the active state, has a given state;

in which the detecting step comprises:

generating a count value, being a number of outermost active indicators in the ordered set of active indicators which are in the inactive state;

shifting the ordered set of predicate indicators by a number of positions dependent upon the count value, to generate a shifted set of predicate indicators; and generating the status flag in dependence upon whether an outermost one of the shifted set of predicate indicators has the given state.

Referring now to the drawings, FIG. 1 schematically illustrates a data processing system 10 comprising a processor 20 coupled to a memory 30 storing data values 32 and program instructions 34.

The processor 20 includes an instruction fetch unit 40 for fetching program instructions 34 from the memory 30 and supplying the fetch program instructions to decoder circuitry 50. The decoder circuitry 50 decodes the fetched program instructions and generates control signals to control vector processing circuitry 60 to perform vector processing operations upon vector registers stored within vector register circuitry 70 as specified by the decoded vector instructions.

The processor 20 also comprises scalar processing circuitry such as an integer arithmetic logic unit (IALU) 80 associated with scalar registers 90.

A general distinction between scalar processing and vector processing is as follows. Vector processing involves applying a single vector processing instruction to data items of a data vector having a plurality of data items at respective positions in the data vector. Scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

Vector processing is carried out by the vector processor 60 in respect of (and to generate) data vectors stored in the vector registers 70. Vector operations can be carried out under the control of so-called predicate indicators held in a predicate store 100. The use of predicate indicators will be discussed in more detail below, but in brief, the vector processing circuitry can selectively apply vector processing operations to one or more data items of one or more data vectors each comprising an ordered plurality of data items at respective vector positions in the data vector, according to the state of respective predicate indicators associated with the vector positions. So, in at least some example systems, there is one predicate indicator for each possible vector position, and the state of the predicate indicator (for example, for a one-bit predicate indicator, whether the predicate indicator is a 1 or a 0) controls the way in which vector calculations are carried out at that vector position. One example is that in an arrangement in which vector processing is carried out to generate an output vector, the predicate indicators are used to determine whether or not the processing is performed in respect of each vector position in the output data vector (otherwise known as a "lane".

The sets of predicate indicators can be generated by the vector processor 60, and/or by a scalar unit referred to in FIG. 1 as a predicate arithmetic logic unit (P-ALU) 110. These (separately or collectively) provide the function of predicate generation circuitry to apply a processing operation to generate an ordered set of predicate indicators, each associated with a respective one of the vector positions can be associated with an ordered set of active indicators each having an active or an inactive state. For example, the active indicators may in fact be another set of predicate indicators used for this purpose. In some examples, a predicate indicator is taken into account if the active indicator at the same vector position is active, and is not taken into account otherwise.

Predicate indicators and active indicators could be formed as sets of multi-bit indicators, but in the present examples, one-bit indicators will be considered, having an active state (for an active indicator) and a "proceed" state indicating that the calculation in the corresponding lane should proceed (for a predicate indicator) represented by a logical 1. However, it will of course be appreciated that other representations such as other polarities or numbers of bits could be used. Where references are made to bit-wise operations with respect to predicate indicators or active indicators, this should be taken to refer to the appropriate corresponding operation in the case of multiple bit indicators.

A flag store 120 is arranged to store flags associated with the stored sets of predicate indicators. Example flags (which are stored on a set by set basis for the sets of predicate indicators) are a zero flag Z indicating (when equal to a 1) that no predicate indicators are in the proceed state in that set of predicate indicators; an N flag indicating (when equal to a 1) that the least significant predicate indicator in the ordered set for which the corresponding active indicator is "active" is in a proceed state, and a C flag indicating (when equal to a 0) that the most significant predicate indicator in the ordered set for which the corresponding active indicator is "active" is in a proceed state. The N and C flags represent examples of a status flag indicative of whether a predicate indicator at a position, in the ordered set of predicate indicators, corresponding to the position of an outermost active indicator having the active state, has a given state. In this context, "outermost" refers to either or both of most significant or least significant, with respect to the ordered set of predicate indicators. The flags are generated by the P-ALU 110 and stored in the flag store 120 in response to the generation or modification of a set of predicate indicators. The flags can be used, for example, to control conditionally executed processing functions such as branch instructions.

A load-store unit (LSU) 130 controls the reading from and writing to the scalar registers 90 and the vector registers 70.

The vector processor 60 provides an example of processing circuitry to selectively apply vector processing operations to one or more data items of one or more data vectors each comprising a plurality of data items at respective vector positions in the data vector, according to the state of respective predicate indicators associated with the vector positions. The decoder 50 and the vector processor 60 also provide an example of instruction decoder circuitry to decode program instructions; and instruction processing circuitry to execute instructions decoded by the instruction decoder circuitry.

Figure 2:
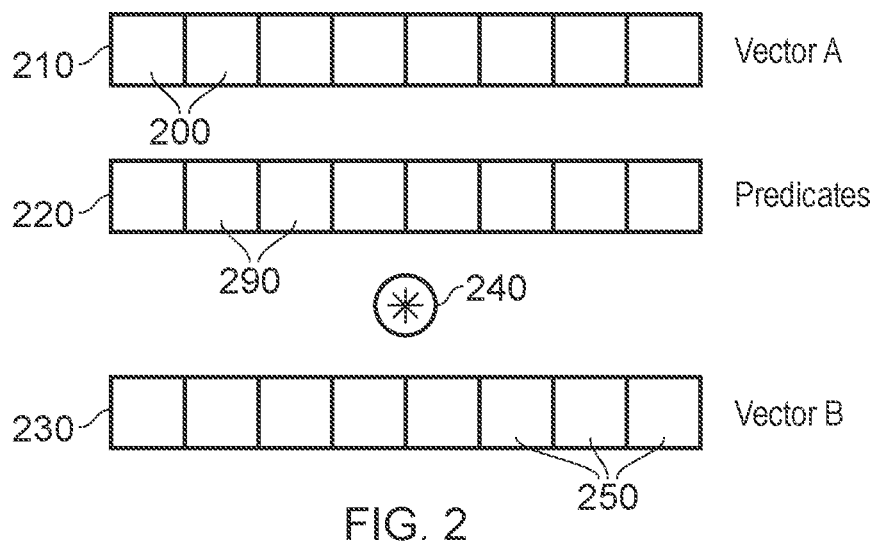
FIG. 2 schematically illustrates the use of predicate indicators.

FIG. 2 schematically illustrates the use of predicate indicators to control vector processing operations.

There can be instances where a single vector processing operation should be applied differently to different data items within a data vector. As mentioned above, the vector processing circuitry 60 provides for this by the use of so-called predicate indicators. Predicate indicators comprise information provided for each data item position within a data vector to indicate whether a processing operation should be carried out in respect of that data item position. In examples, the vector processing circuitry 60 can access multiple sets of predicate indicators, such that any particular vector processing operation can refer to one or more sets of predicate indicators as parameters to that vector processing operation.

Referring to FIG. 2, an example arrangement uses data vectors comprising eight data items 200 (Vector length $V_L=8$) but it will be appreciated that these arrangements can apply to different vector lengths. An example input data vector 210 (Vector A) is to be the subject of a vector processing operation 240 such that, in the absence of any control by predicate indicators, the vector processing operation 240 would be applied to each data item position. However, a set of predicate indicators 220, one for each data item position or "lane", is also provided to control the vector processing operation.

The data items 200 of the input vector (Vector A) are processed according to the vector processing operation 240 to generate data items 250 of an output data vector 230 (Vector B). If the predicate indicator 290 corresponding to a data item position in the output data vector 280 is set to "proceed" (for example, a value of 1) then the vector processing operation 240 in respect of that output vector position is carried out. If the corresponding predicate indicator for an output vector position is set to "do not proceed" (for example, a value of 0) then the vector processing operation 240 in respect of that output vector position is not carried out.

As mentioned above, in the present examples the predicate indicators control whether a vector processing operation for a particular output position or "lane" in relation to the output data vector 230 is carried out. However, in other examples, predicate indicators could be used to control whether data item positions in the input vector (or one or more input vectors) 210 are used.

This therefore provides an example of the predicate indicators having a state indicating that the vector processing instruction should be applied to those positions of a data vector corresponding to predicate indicators in that state, and another state indicating that the vector processing operation should not be so applied.

If a vector processing operation is not carried out in respect of a particular output vector position 250, because of the state of a predicate indicator, then in some examples a fixed value such as 0 can be inserted into that output position. In other examples the previous contents, whatever they are, of that output position can be left unchanged.

FIG. 2 therefore provides an example in which the processing circuitry is configured to apply a vector processing operation to generate an output data vector; and the predicate indicators are associated with respective vector positions in the output data vector so that vector processing operations are applied to generate data items in the output data vector at vector positions indicated by predicate indicators in the given state.

Figure 3:
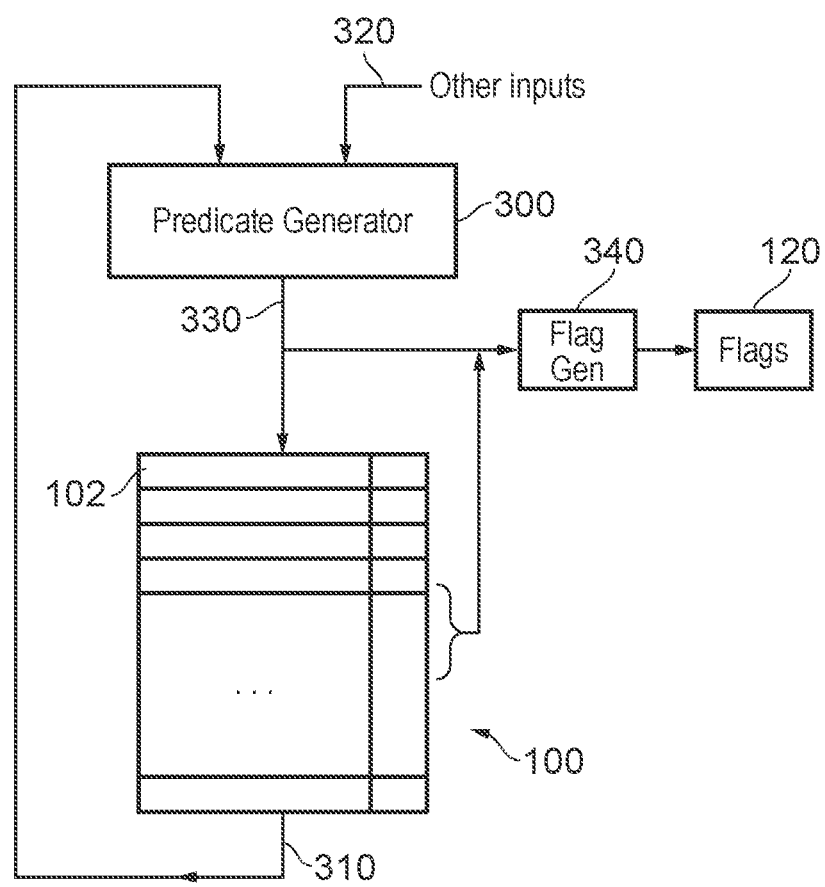
FIG. 3 schematically illustrates predicate generation.
Figure 4:
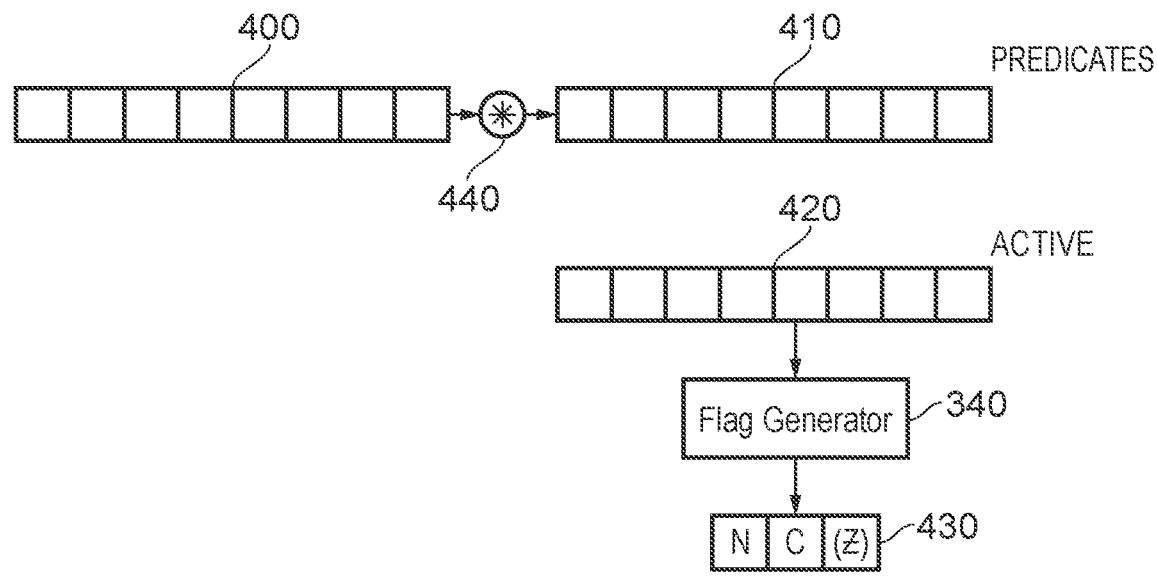
FIG. 4 schematically illustrates the flag generation process in more detail.

FIGS. 3 and 4 are schematic flow charts relating to the use of a count of a number of predicate indicators in a given state.

As technical background, in some data processing systems a count of the number of predicate indicators in a set of predicate indicators which are set to the "proceed" state (as an example of a "given state"), or in other words indicating that the corresponding vector position should be implemented as part of a vector calculation, is relevant to the execution of some instructions. This could be in the form of an operand or input data value provided to those instructions, or it could be that the instruction, as part of its execution, needs first to calculate the count of predicate indicators in the given state.

FIG. 3 schematically illustrates predicate generation. A predicate generator 300 (for example the vector processor 60 as part of its functionality and/or the P-ALU 110 as part of its functionality) is arranged to generate one or more sets of predicate indicators for storage in the predicate store 100. The generation is based on one or both of: (a) one or more sets of predicate indicators 310 retrieved from the predicate store 100 and (b) one or more other inputs 320 which may be vector or scalar inputs or both. Based on these inputs, the predicate generator 300 generates one or more sets 330 of predicate indicators to be stored at an appropriate location 102 in the predicate store 100.

A flag generator 340, which may be part of the functionality of the P-ALU 110 or may be a different circuitry unit, generates flags including at least the N and C flags discussed above based upon either or both of the newly generated set of predicate indicators 330 and one or more sets of active indicators which may be, for example, stored in the predicate store 100. The flags are stored in the flag store 120.

FIG. 4 schematically illustrates the flag generation process in more detail, at least as far as an example of that process is concerned.

As mentioned above, the generation of a set of predicate indicators can be based upon vector and/or scalar inputs, and the vector inputs may include one or more existing sets of predicate indicators. In FIG. 4, an existing set of predicate indicators 400 (read from the predicate store 100 as information 310 in FIG. 3) is processed by a logical or other process 440 to generate a newly generated set of predicate indicators 410 (corresponding to the set 330 in FIG. 3). Note that the process 440 may involve a scalar and/or vector process and may involve a combination with one or more vectors or other sets of predicate indicators. This newly generated set 410 is not only stored in the predicate store 100 but is also provided to the flag generator 340, along with a set of active indicators 420 (which may be a set of predicate indicators read from the predicate store, for example). The flag generator 340 generates the N and C flags 430 (optionally with a Z flag indicating all zero ("do not proceed") values of the predicate indicators 420).

Example arrangements to generate the N and C flags, which depend not only upon a set of predicate flags but also a set of associated active indicators, will now be described. These example arrangements can provide much more straightforward processing operations when compared to previously proposed arrangements and can allow the use of simple arithmetic logic already present (and either normally used for other purposes or normally unused on, for example, an integrated circuit device).

Figure 5:
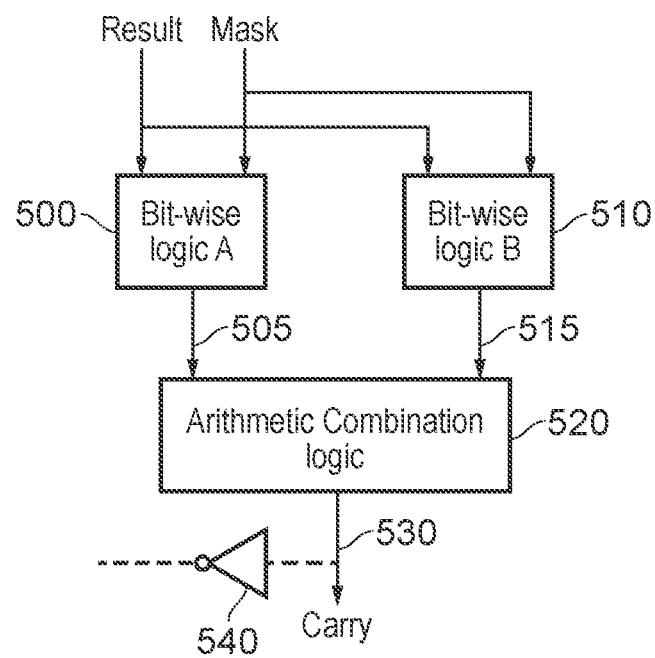
FIG. 5 schematically illustrates a flag generator.

In FIG. 5 and subsequent figures, a newly generated set of predicate indicators may be referred to as "Result" and the set of active indicators associated with it may be referred to as "Mask". There is one data item or indicator in the Mask set for each data item or indicator in the Result set. Each of the two sets is an ordered set, for example running between a most significant and a least significant indicator. The C flag indicates whether that predicate indicator of the Result set at the most significant active position within the Mask set is set to a given state (such as "proceed", which in these examples will be taken as being indicated by a logical 1 but of course other pluralities or representations are possible) and the N flag indicates whether the predicate indicator in the Result set at the least significant active position in the Mask set is set to the given state.

The two sets of indicators, Result and Mask, are provided in FIG. 5 to logic operations, bit-wise logic A 500 and bit-wise logic B 510. These generate respective outputs 505, 515 which are provided to an arithmetic combination logic 520 which, as part of its operation, generates a carry bit 530. Examples of how these arrangements can be used will be discussed further below.

FIG. 5 therefore provides an example of a detector to detect a status flag indicative of whether a predicate indicator at a position, in the ordered set of predicate indicators, corresponding to the position of an outermost active indicator having the active state, has a given state; in which the detector comprises: first 500 and second 510 circuitry to combine the ordered set of predicate indicators and the ordered set of active indicators using first and second respective logical bit-wise combinations to generate first and second ordered sets of intermediate data; and arithmetic combination circuitry 520 to combine the first and second ordered sets of intermediate data using an arithmetic combination generating a carry bit, the detector generating the status flag in dependence (for example, via the invertor 540) upon the carry bit.

In examples, the arithmetic operation is logically equivalent to an arithmetic addition operation.

Figure 6:
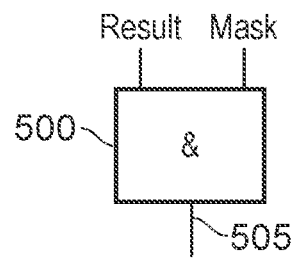
FIGS. 6 and 7 schematically illustrate example bit-wise combinations.
Figure 7:
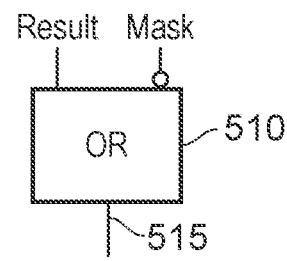

FIGS. 6 and 7 schematically illustrate example bit-wise logic for use as the bit-wise logic A and the bit-wise logic B of FIG. 5. In particular, FIG. 6 schematically illustrates a bit-wise logical AND operation (for example, for use as the bit-wise logic A 500 generating an output 505) and FIG. 7 schematically illustrates example bit-wise logic (Result OR (NOT Mask)), for example for use as the bit-wise logic B 510 generating the output 515. Note of course that the circuitry in FIG. 5 is symmetric so either of FIGS. 6 and 7 could be used as the bit-wise logic A and the other as the bit-wise logic B.

It will also be appreciated that logical combinations can be provided which are logically equivalent to these arrangements. For example, in the case of FIG. 6, the logic ((NOT Result) NOR (NOT Mask)) would provide an equivalent outcome. It will therefore be appreciated that the representations in FIGS. 6 and 7 (and indeed those to be discussed below) are indications of the logical outcome which is provided but the logic circuitry to achieve that simply needs to provide the equivalent logic function rather than being restricted to this specific use of (for example) an AND gate.

Where the examples of FIGS. 6 and 7 are used, the arithmetic combination logic 520 may be an arithmetic adder, in which case the carry bit 530 provides an active-high C flag or, with the provision of an optional inverter 540, an active-low C flag is generated.

Therefore, FIGS. 6 and 7 provide an example in which the first logical bit-wise combination is logically equivalent to a logical AND combination; and the second logical bit-wise combination is logically equivalent to a logical OR combination of the ordered set of predicate indicators with the bit-wise inverse of the ordered set of active indicators.

With regard to the generation of the C flag, in examples, the ordered set of predicate indicators and the ordered set of active indicators are ordered between a least significant position and a most significant position; and the status flag is indicative of whether a predicate indicator at a position, in the ordered set of predicate indicators, corresponding to the position of a most significant active indicator having the active state, has the given state. The detector may be configured to invert 540 the carry bit.

The example arrangements of FIGS. 6 and 7 can be used in the generation of the N flag by techniques to be described with reference to FIGS. 8a to 9b. Here, the bit-wise logic A and the bit-wise logic B incorporate a bit reversal, which is to say that under the bit reversal process, the ordering of the relevant information (either the Result and Mask indicators or the outputs of the bit-wise combinations discussed above) are reversed in order so that the least significant bit becomes the most significant bit and the most significant bit becomes the least significant bit. This bit reversal can be carried out before or after the logical AND and NOT OR combinations discussed above.

Figure 8A:
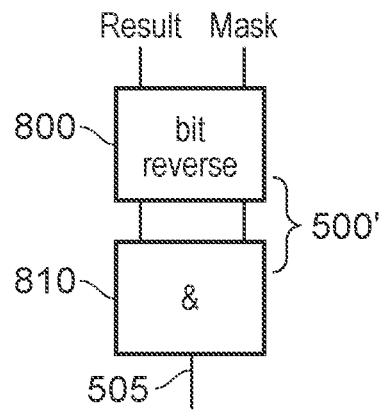
FIGS. 8*a*, 8*b*, 9*a* and 9*b* schematically illustrate example bit-wise combinations.
Figure 8B:
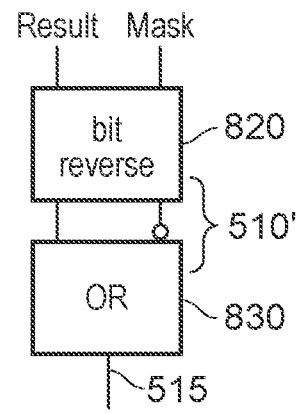

In FIGS. 8a and 8b, the bit-wise logic A (500') comprises bit reversal logic 800 followed by a logical AND combination 810 or its logical equivalent. The bit-wise logic B 510' comprises bit reversal logic 820 followed by the arrangement of FIG. 7 830.

Figure 9A:
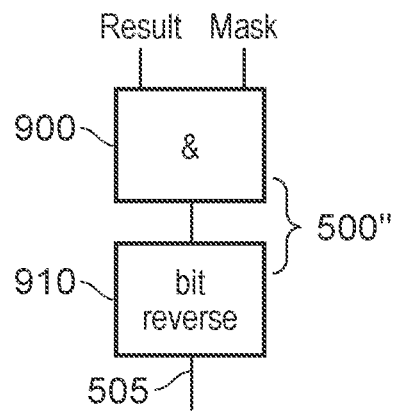
Figure 9B:
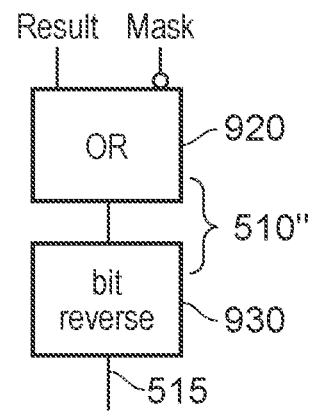

Referring to FIGS. 9a and 9b, the bit-wise logic A 500" comprises an AND combination 900 or its logical equivalent followed by bit reversal logic 910, and in FIG. 9b the bit-wise logic B 510" comprises the arrangement of FIG. 7 920 followed by bit reversal logic 930. The outputs 505, 515 are, in each case (that is to say, the situation of FIGS. 8a and 8b or the situation of FIGS. 9a and 9b) combined by the adder forming the arithmetic combination logic 520, and the carry output 530 represents the N flag.

FIGS. 8a, 8b, 9a and 9b provide examples in which the detector is configured to bit-reverse either (i) the ordered set of predicate indicators and the ordered set of active indicators to generate respective bit-reversed versions, the first and second circuitry acting on the bit-reversed versions of the ordered set of predicate indicators and the ordered set of active indicators; or (ii) the first and second ordered sets of intermediate data to generate respective bit-reversed versions, the arithmetic circuitry acting on the bit-reversed versions of the first and second ordered sets of intermediate data.

In such examples, the ordered set of predicate indicators and the ordered set of active indicators may be ordered between a least significant position and a most significant position; and the status flag is indicative of whether a predicate indicator at a position, in the ordered set of predicate indicators, corresponding to the position of a least significant active indicator having the active state, has the given state.

Worked examples will now be provided.

Consider the following example sets of indicators:

Result[7:0]—which is to say, the most significant bit is at the left:

| 1 | 0 | 1 | 1 | 1 | 1 | 0 | 1 |

Mask[7:0]:

| 0 | 0 | 1 | 1 | 1 | 1 | 1 | 0 |

In this example, the N flag would be set low because Mask[4]=1 and Result[1]=0.

Similarly, in this example, the C flag (active low) would be set low because Mask[5]=1 and Result[5]=1.

Applying the first bit-wise logic (AND) the outcome is:

| 0 | 0 | 1 | 1 | 1 | 1 | 0 | 0 |

Applying the second bit-wise logic the outcome is:

| 1 | 1 | 1 | 1 | 1 | 1 | 0 | 1 |

The addition of these two outcomes gives:

| Carry 1 | 0 | 0 | 1 | 1 | 1 | 1 | 0 | 1 |

NOT (carry) therefore gives the required C flag.

In other examples, the arithmetic combination logic 520 may be implemented as an arithmetic subtractor (subtraction operation). In these examples, the logic arrangement of FIG. 6 (and the corresponding portions 810, 900 of FIGS. 8a and 9a) may still be used (or its logical equivalent) but the arrangement of FIG. 7 (and that of the items 830, 920 of FIGS. 8b and 9b) is slightly different. In the case of the arithmetic combination logic 520 being a subtractor, the logical arrangement for FIG. 7 is replaced by (Mask AND (NOT Result)) or its logical equivalent. In other words, the first logical bit-wise combination is logically equivalent to a logical AND combination; and the second logical bit-wise combination is logically equivalent to a logical AND combination of the ordered set of active indicators with the bit-wise inverse of the ordered set of predicate indicators. In examples, the ordered set of predicate indicators and the ordered set of active indicators are ordered between a least significant position and a most significant position; and the status flag is indicative of whether a predicate indicator at a position, in the ordered set of predicate indicators, corresponding to the position of a most significant active indicator having the active state, has the given state.

Again, in these examples, the detector may be configured to invert the carry bit.

In examples, the detector may be configured to bit-reverse either (i) the ordered set of predicate indicators and the ordered set of active indicators to generate respective bit-reversed versions, the first and second circuitry acting on the bit-reversed versions of the ordered set of predicate indicators and the ordered set of active indicators; or (ii) the first and second ordered sets of intermediate data to generate respective bit-reversed versions, the arithmetic circuitry acting on the bit-reversed versions of the first and second ordered sets of intermediate data.

In examples, the ordered set of predicate indicators and the ordered set of active indicators are ordered between a least significant position and a most significant position; and the status flag is indicative of whether a predicate indicator at a position, in the ordered set of predicate indicators, corresponding to the position of a least significant active indicator having the active state, has the given state.

In examples, the active state and the given state are each represented by a logical 1.

Figure 10:
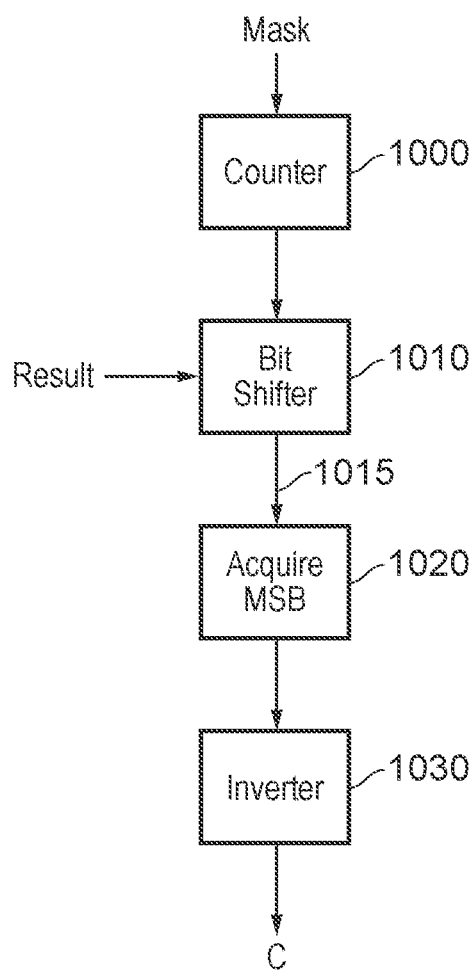
FIGS. 10 and 11 schematically illustrate further examples of flag generators.
Figure 11:
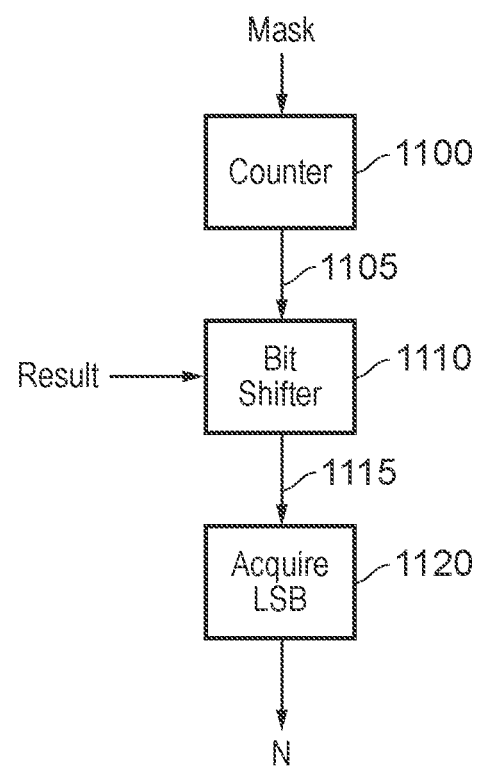

FIGS. 10 and 11 schematically illustrate further examples of flag generators such as the flag generator 340. In particular, FIG. 10 schematically illustrates the generation of the active-low C flag and FIG. 11 schematically illustrates the generation of the N flag.

The circuitry of FIGS. 10 and 11 once again has the Mask and Result sets of indicators as inputs, and it is assumed for simplicity of the description that these are one-bit indicators where a logical 1 represents an active or "proceed" state. However, once again it will be appreciated that multiple bit representations or the other plurality may be used.

Referring to FIG. 10, the Mask set of indicators is provided to a counter 1000 which counts (in this example) the number of most significant zeros indicating the number of most significant positions within the Mask indicators which are set to a not-active state. A bit-shifter 1010 receives the result set of indicators and bit-shifts them in a way most significant or more significant direction by the number identified by the counter 1000. This moves the predicate indicator of the Result set which has a position corresponding to the most significant active bit of the Mask set to the most significant position within a bit-shifted set 1015. Logic 1020 then acquires the most significant bit of the bit-shifted set 1015 and an inverter 1030 inverts it to provide the active-low C flag.

FIG. 11 provides a similar arrangement to detect the N flag, in that the set of Mask indicators are provided to a counter 1100 which counts a number 1105 of least significant indicators within the Mask set which are set to a not-active state. A bit-shifter 1100 bit shifts the result set of indicators in a less significant direction by the number 1105 identified by the counter 1100 to generate a bit-shifted result set 1115. The least significant bit of that bit-shifted result set 1115 is acquired by logic 1120 to form the N flag.

The arrangements of FIGS. 10 and 11 provide examples of data processing apparatus comprising:

processing circuitry to selectively apply vector processing operations to one or more data items of one or more data vectors each comprising an ordered plurality of data items at respective vector positions in the data vector, according to the state of respective predicate indicators associated with the vector positions;

predicate generation circuitry to apply a processing operation to generate an ordered set of predicate indicators, each associated with a respective one of the vector positions, the ordered set of predicate indicators being associated with an ordered set of active indicators each having an active or an inactive state; and a detector to detect a status flag indicative of whether a predicate indicator at a position, in the ordered set of predicate indicators, corresponding to the position of an outermost active indicator having the active state, has a given state;

in which the detector comprises:

count circuitry to generate a count value, being a number of outermost active indicators in the ordered set of active indicators which are in the inactive state;

shift circuitry to shift the ordered set of predicate indicators by a number of positions dependent upon the count value, to generate a shifted set of predicate indicators; and output circuitry to generate the status flag in dependence upon whether an outermost one of the shifted set of predicate indicators has the given state.

FIG. 10 provides an example in which:

the ordered set of predicate indicators and the ordered set of active indicators are ordered between a least significant position and a most significant position;

the status flag is indicative of whether a predicate indicator at a position, in the ordered set of predicate indicators, corresponding to the position of a most significant active indicator having the active state, has the given state;

the count circuitry is configured to generate the count value as a number of most significant active indicators in the ordered set of active indicators which are in the inactive state;

the shift circuitry is configured to shift the ordered set of predicate indicators in a more significant direction; and the output circuitry is configured to generate the status flag in dependence upon whether a most significant bit of the shifted set of predicate indicators has the given state.

FIG. 11 provides an example in which:

the ordered set of predicate indicators and the ordered set of active indicators are ordered between a least significant position and a most significant position;

the status flag is indicative of whether a predicate indicator at a position, in the ordered set of predicate indicators, corresponding to the position of a least significant active indicator having the active state, has the given state;

the count circuitry is configured to generate the count value as a number of least significant active indicators in the ordered set of active indicators which are in the inactive state;

the shift circuitry is configured to shift the ordered set of predicate indicators in a less significant direction; and the output circuitry is configured to generate the status flag in dependence upon whether a least significant bit of the shifted set of predicate indicators has the given state.

Figure 12:
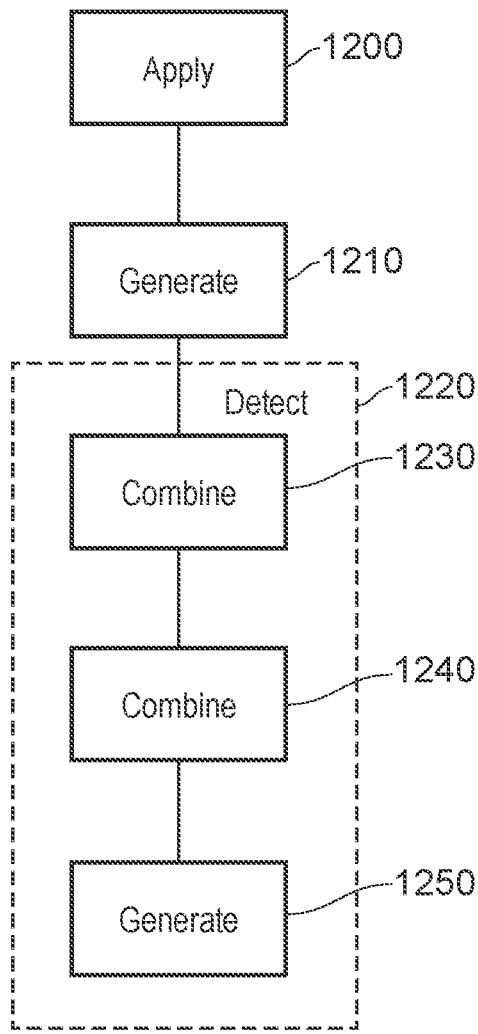
FIGS. 12 and 13 are schematic flowcharts illustrating methods.

FIG. 12 is a schematic flowchart illustrating a data processing method comprising:

(at a step 1200) selectively applying vector processing operations to one or more data items of one or more data vectors each comprising an ordered plurality of data items at respective vector positions in the data vector, according to the state of respective predicate indicators associated with the vector positions;

(at a step 1210) generating an ordered set of predicate indicators, each associated with a respective one of the vector positions, the ordered set of predicate indicators being associated with an ordered set of active indicators each having an active or an inactive state; and (at a step 1220) detecting a status flag indicative of whether a predicate indicator at a position, in the ordered set of predicate indicators, corresponding to the position of an outermost active indicator having the active state, has a given state;

in which the detecting step comprises:

(at a step 1230) combining the ordered set of predicate indicators and the ordered set of active indicators using first and second respective logical bit-wise combinations to generate first and second ordered sets of intermediate data;

(at a step 1240) combining the first and second ordered sets of intermediate data using an arithmetic combination generating a carry bit; and (at a step 1250) generating the status flag in dependence upon the carry bit.

Figure 13:
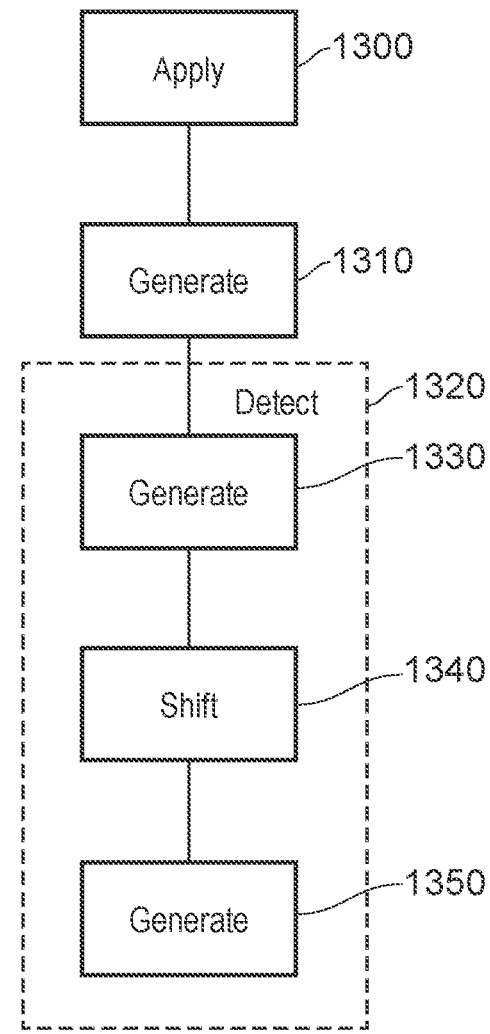

FIG. 13 is a schematic flowchart illustrating a data processing method comprising:

(at a step 1300) selectively applying vector processing operations to one or more data items of one or more data vectors each comprising an ordered plurality of data items at respective vector positions in the data vector, according to the state of respective predicate indicators associated with the vector positions;

(at a step 1310) generating an ordered set of predicate indicators, each associated with a respective one of the vector positions, the ordered set of predicate indicators being associated with an ordered set of active indicators each having an active or an inactive state; and (at a step 1320) detecting a status flag indicative of whether a predicate indicator at a position, in the ordered set of predicate indicators, corresponding to the position of an outermost active indicator having the active state, has a given state;

in which the detecting step comprises:

(at a step 1330) generating a count value, being a number of outermost active indicators in the ordered set of active indicators which are in the inactive state;

(at a step 1340) shifting the ordered set of predicate indicators by a number of positions dependent upon the count value, to generate a shifted set of predicate indicators; and (at a step 1350) generating the status flag in dependence upon whether an outermost one of the shifted set of predicate indicators has the given state.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Data processing apparatus comprising:
   processing circuitry to selectively apply vector processing operations to one or more data items of one or more data vectors each comprising an ordered plurality of data items at respective vector positions in the data vector, according to the state of respective predicate indicators associated with the vector positions;
   predicate generation circuitry to apply a processing operation to generate an ordered set of predicate indicators, each configured to control whether a processing operation should proceed at a respective one of the vector positions; and
   a generator to receive the ordered set of predicate indicators generated by the predicate generation circuitry and an ordered set of active indicators each having an active or an inactive state, and to generate a status flag indicative of whether a predicate indicator at a position, in the ordered set of predicate indicators, has a given state indicating that a processing operation should proceed at that position, wherein the position corresponds to a position of a most significant or least significant active indicator, of the ordered set of active indicators, having the active state;
   in which the generator comprises:
   first and second circuitry to combine the ordered set of predicate indicators and the ordered set of active indicators using first and second respective logical bit-wise combinations to generate first and second ordered sets of intermediate data; and
   arithmetic circuitry to combine the first and second ordered sets of intermediate data using an arithmetic combination generating a carry bit, the generator generating the status flag in dependence upon the carry bit; and
   in which the processing circuitry is configured to control a conditionally executed processing operation in dependence upon the status flag.

2. Apparatus according to claim 1, in which: the arithmetic operation is logically equivalent to an arithmetic addition operation.

3. Apparatus according to claim 2, in which:
   the first logical bit-wise combination is logically equivalent to a logical AND combination; and
   the second logical bit-wise combination is logically equivalent to a logical OR combination of the ordered set of predicate indicators with the bit-wise inverse of the ordered set of active indicators.

4. Apparatus according to claim 3, in which:
   the ordered set of predicate indicators and the ordered set of active indicators are ordered between a least significant position and a most significant position; and
   the status flag is indicative of whether a predicate indicator at a position, in the ordered set of predicate indicators, corresponding to the position of the most significant active indicator having the active state, has the given state.

5. Apparatus according to claim 4, in which the generator is configured to invert the carry bit.

6. Apparatus according to claim 3, in which the generator is configured to bit-reverse the order of either (i) the ordered set of predicate indicators and the ordered set of active indicators to generate respective bit-reversed versions, the first and second circuitry acting on the bit-reversed versions of the ordered set of predicate indicators and the ordered set of active indicators; or (ii) the first and second ordered sets of intermediate data to generate respective bit-reversed versions, the arithmetic circuitry acting on the bit-reversed versions of the first and second ordered sets of intermediate data.

7. Apparatus according to claim 6, in which:
   the ordered set of predicate indicators and the ordered set of active indicators are ordered between a least significant position and a most significant position; and
   the status flag is indicative of whether a predicate indicator at a position, in the ordered set of predicate indicators, corresponding to the position of the least significant active indicator having the active state, has the given state.

8. Apparatus according to claim 1, in which: the arithmetic operation is logically equivalent to an arithmetic subtraction operation.

9. Apparatus according to claim 8, in which:
   the first logical bit-wise combination is logically equivalent to a logical AND combination; and
   the second logical bit-wise combination is logically equivalent to a logical AND combination of the ordered set of active indicators with the bit-wise inverse of the ordered set of predicate indicators.

10. Apparatus according to claim 9, in which:
    the ordered set of predicate indicators and the ordered set of active indicators are ordered between a least significant position and a most significant position; and
    the status flag is indicative of whether a predicate indicator at a position, in the ordered set of predicate indicators, corresponding to the position of the most significant active indicator having the active state, has the given state.

11. Apparatus according to claim 10, in which the generator is configured to invert the carry bit.

12. Apparatus according to claim 9, in which the generator is configured to bit-reverse the order of either (i) the ordered set of predicate indicators and the ordered set of active indicators to generate respective bit-reversed versions, the first and second circuitry acting on the bit-reversed versions of the ordered set of predicate indicators and the ordered set of active indicators; or (ii) the first and second ordered sets of intermediate data to generate respective bit-reversed versions, the arithmetic circuitry acting on the bit-reversed versions of the first and second ordered sets of intermediate data.

13. Apparatus according to claim 12, in which:
    the ordered set of predicate indicators and the ordered set of active indicators are ordered between a least significant position and a most significant position; and
    the status flag is indicative of whether a predicate indicator at a position, in the ordered set of predicate indicators, corresponding to the position of the least significant active indicator having the active state, has the given state.

14. Apparatus according to claim 1, in which:
the processing circuitry is configured to apply a vector processing operation to generate an output data vector; and
the predicate indicators are associated with respective vector positions in the output data vector so that vector processing operations are applied to generate data items in the output data vector at vector positions indicated by predicate indicators in the given state.

15. Apparatus according to claim 1, in which the processing circuitry comprises:
instruction decoder circuitry to decode program instructions; and
instruction processing circuitry to execute instructions decoded by the instruction decoder circuitry.

16. Apparatus according to claim 1, in which the active state and the given state are each represented by a logical 1.

17. Data processing apparatus comprising:
processing circuitry to selectively apply vector processing operations to one or more data items of one or more data vectors each comprising an ordered plurality of data items at respective vector positions in the data vector, according to the state of respective predicate indicators associated with the vector positions;
predicate generation circuitry to apply a processing operation to generate an ordered set of predicate indicators, each configured to control whether a processing operation should proceed at a respective one of the vector positions; and
a generator to receive the ordered set of predicate indicators generated by the predicate generation circuitry and an ordered set of active indicators each having an active or an inactive state, and to generate a status flag indicative of whether a predicate indicator at a position, in the ordered set of predicate indicators, has a given state indicating that a processing operation should proceed at that position, wherein the position corresponds to a position of a most significant or least significant active indicator, of the ordered set of active indicators, having the active state;
in which the generator comprises:
count circuitry to generate a count value, being a number of most significant or least significant active indicators in the ordered set of active indicators which are in the inactive state;
shift circuitry to shift the ordered set of predicate indicators by a number of positions dependent upon the count value, to generate a shifted set of predicate indicators; and
output circuitry to generate the status flag in dependence upon whether a most significant or least significant one of the shifted set of predicate indicators has the given state; and
in which the processing circuitry is configured to control a conditionally executed processing operation in dependence upon the status flag.

18. Apparatus according to claim 17, in which:
the ordered set of predicate indicators and the ordered set of active indicators are ordered between a least significant position and a most significant position;
the status flag is indicative of whether a predicate indicator at a position, in the ordered set of predicate indicators, corresponding to the position of the most significant active indicator having the active state, has the given state;
the count circuitry is configured to generate the count value as a number of most significant active indicators in the ordered set of active indicators which are in the inactive state;
the shift circuitry is configured to shift the ordered set of predicate indicators in a more significant direction; and
the output circuitry is configured to generate the status flag in dependence upon whether the most significant bit of the shifted set of predicate indicators has the given state.

19. Apparatus according to claim 17, in which:
the ordered set of predicate indicators and the ordered set of active indicators are ordered between a least significant position and a most significant position;
the status flag is indicative of whether a predicate indicator at a position, in the ordered set of predicate indicators, corresponding to the position of the least significant active indicator having the active state, has the given state;
the count circuitry is configured to generate the count value as a number of least significant active indicators in the ordered set of active indicators which are in the inactive state;
the shift circuitry is configured to shift the ordered set of predicate indicators in a less significant direction; and
the output circuitry is configured to generate the status flag in dependence upon whether the least significant bit of the shifted set of predicate indicators has the given state.

20. A data processing method comprising:
selectively applying vector processing operations to one or more data items of one or more data vectors each comprising an ordered plurality of data items at respective vector positions in the data vector, according to the state of respective predicate indicators associated with the vector positions;
generating an ordered set of predicate indicators, each configured to control whether a processing operation should proceed at a respective one of the vector positions;
receiving the generated ordered set of predicate indicators and an ordered set of active indicators each having an active or an inactive state, and generating a status flag indicative of whether a predicate indicator at a position, in the ordered set of predicate indicators, has a given state indicating that a processing operation should proceed at that position, wherein the position corresponds to a position of a most significant or least significant active indicator, of the ordered set of active indicators, having the active state;
in which the generating step comprises:
combining the ordered set of predicate indicators and the ordered set of active indicators using first and second respective logical bit-wise combinations to generate first and second ordered sets of intermediate data;
combining the first and second ordered sets of intermediate data using an arithmetic combination generating a carry bit; and
generating the status flag in dependence upon the carry bit; and
controlling a conditionally executed processing operation in dependence upon the status flag.

21. A data processing method comprising:
  selectively applying vector processing operations to one or more data items of one or more data vectors each comprising an ordered plurality of data items at respective vector positions in the data vector, according to the state of respective predicate indicators associated with the vector positions;
  generating an ordered set of predicate indicators, each configured to control whether a processing operation should proceed at a respective one of the vector positions; and
  receiving the generated ordered set of predicate indicators and an ordered set of active indicators each having an active or an inactive state, and generating a status flag indicative of whether a predicate indicator at a position, in the ordered set of predicate indicators, has a given state indicating that a processing operation should proceed at that position, wherein the position corresponds to the position of a most significant or least significant active indicator having the active state;
  in which the generating step comprises:
  generating a count value, being a number of most significant or least significant active indicators in the ordered set of active indicators which are in the inactive state;
  shifting the ordered set of predicate indicators by a number of positions dependent upon the count value, to generate a shifted set of predicate indicators;
  generating the status flag in dependence upon whether a most significant or least significant one of the shifted set of predicate indicators has the given state; and
  controlling a conditionally executed processing operation in dependence upon the status flag.

* * * * *